United States Patent [19]

Reinhardt

[11] Patent Number: 4,890,248

[45] Date of Patent: Dec. 26, 1989

[54] METHOD AND APPARATUS FOR REDUCING ALIASING IN SIGNAL PROCESSING

[75] Inventor: Victor S. Reinhardt, Rancho Palos Verdes, Calif.

[73] Assignee: Hughes Aircraft Company, Los Angeles, Calif.

[21] Appl. No.: 56,195

[22] Filed: Jun. 1, 1987

[51] Int. Cl.⁴ .................... H04L 27/12; G06F 1/02
[52] U.S. Cl. ..................................... 364/574; 328/59; 307/523
[58] Field of Search ............... 364/574, 717, 718, 701, 364/572, 508; 375/26; 328/14, 59, 66; 307/522, 523; 340/347 AD, 347 SH; 331/78

[56] References Cited

U.S. PATENT DOCUMENTS

| | | | |
|---|---|---|---|
| 4,112,425 | 9/1978 | Zobrist et al. | 340/347 AD |
| 4,136,326 | 1/1979 | Naudot et al. | 367/39 |
| 4,142,146 | 2/1979 | Schumann et al. | 340/347 AD |
| 4,176,399 | 11/1979 | Hoffmann et al. | 364/717 |
| 4,188,583 | 2/1980 | McCurdy | 332/16 R |

Primary Examiner—Parshotam S. Lall
Assistant Examiner—Ellis B. Ramirez
Attorney, Agent, or Firm—Steven M. Mitchell; Wanda Denson-Low

[57] ABSTRACT

A method and apparatus for reducing the introduction of alias frequencies in the processing of signals. A sequence of jittered pulses is provided, each pulse occurring during one of a sequence of time intervals of duration T at a time determined by a sequential one of a set of independent random numbers having a uniform probability density in a region bounded by zero and T. A signal processing operation, such as sampling a signal or synthesizing a signal having a desired frequency specified by a control signal, is performed in response to the jittered pulses. Setup time aliasing is avoided by alternating between two signal processors, each driven by one of a pair of phase-related sequences of jittered pulses, or, in the case of a frequency synthesizer, by jittering the output signal rather than the input pulses. Phase noise in a synthesized signal is reduced by scaling the control signal according to the durations of the time intervals between successive jittered pulses.

57 Claims, 9 Drawing Sheets

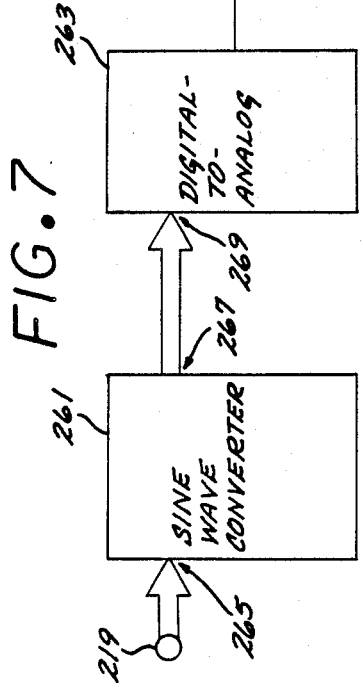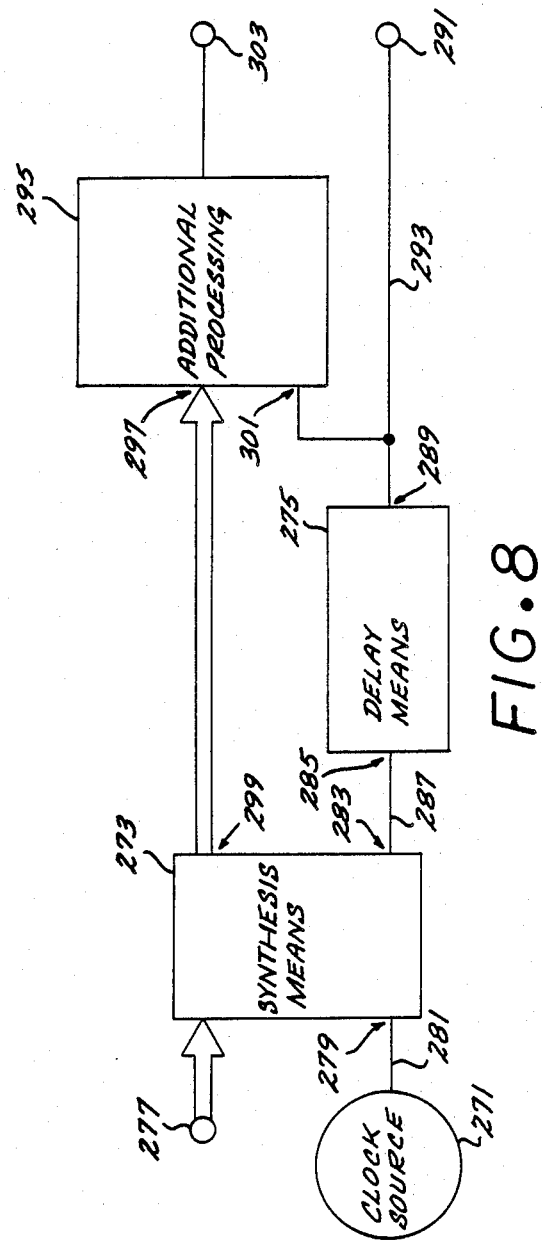

METHOD AND APPARATUS FOR REDUCING ALIASING IN SIGNAL PROCESSING

BACKGROUND OF THE INVENTION

1. Field of the Invention

The present invention relates generally to signal processing, and more particularly to reducing the occurrence of alias frequencies in the processing of signals.

2. The Prior Art

It is often necessary to convert an analog signal comprising various frequencies into a digital signal. This conversion can be accomplished by periodically sampling the analog signal and expressing the instantaneous value of the analog signal in digital form. However, if the signal being sampled contains a frequency which is greater than one-half the sampling frequency, aliasing can occur. "Aliasing" refers to the conversion of high frequency components of the original signal into low frequency components as a side effect of the sampling process.

More particularly, if the signal to be sampled contains a frequency S that is higher than one-half the clock sampling frequency C, then the sampling process will yield "aliases" of S at a plurality of lower frequencies $F_n$ according to the relation $$F_n = S - n*C$$

where n is any integer. To prevent such "alias" frequencies from appearing in the samples, the signal being sampled must first be carefully filtered to remove any frequencies higher than C/2. Unfortunately, such filtering often is difficult to accomplish or results in other unwanted side effects, and hence there is a need for a way to prevent aliasing from taking place during sampling of an unfiltered signal.

Aliasing also poses a problem in the synthesis of a signal having a desired frequency. A synthesizer generates a signal having a desired frequency by a periodic incrementing process, and as a result of this process high-order harmonics of the output frequency are aliased down to lower frequencies and injected into the synthesized signal. In particular, a synthesizer that employs a clock having a frequency C and that provides an output signal having a frequency S will alias an mth harmonic of S down to a plurality of lower frequencies $F_n$ according to the equation $$F_n = m*S - n*C$$

where m and n are any integers, and these unwanted frequencies $F_n$ are found in the output signal along with the desired frequency S.

In an article titled "Alias-Free Sampling of Random Noise" (J. Soc. Indust. App. Math., June 1960, vol. 8, page 225), Shapiro and Silverman demonstrated that aliasing can be entirely prevented by sampling at unequal intervals of time if the intervals are determined according to specified processes. In particular, aliasing does not take place if the time $T_n$ of taking the nth sample is computed according to the equation $$T_n = T_{n-1} + x_n$$

where $T_{n-1}$ is the time of the preceding sample and $x_n$ is a random number determined according to a Poisson process.

A number of other researchers have developed the Shapiro and Silverman approach further, but all of these developments require the use of a Poisson process. It is not feasible to achieve a perfect Poisson process in practice, and although an approximation to such a process can be realized, even in such an approximation some of the random numbers $x_n$ can get so large, compared to the average sampling interval, as to be unwieldy. Accordingly, the Shapiro and Silverman approach has not solved the problem.

A somewhat different approach, applicable specifically to digital synthesizers, is demonstrated in U.S. Pat. No. 4,410,954 (Wheatley). In the Wheatley apparatus, a random variable is combined with a digital frequency-selection word to jitter the word about a pre-selected value. Although this technique reduces aliasing, it increases phase noise, and the end result is a signal having a power spectrum not much better than the power spectrum of a signal produced by a conventional synthesizer and containing alias frequencies.

Accordingly, there is still a need for a practical way to reduce the incidence of alias frequencies during the processing of signals.

SUMMARY OF THE INVENTION

The present invention provides a practical method and apparatus for reducing the effects of aliasing in signal processing. Signal processing apparatus according to the invention includes jittered pulse means to provide a sequence of jittered pulses, each pulse occurring during one of a sequence of time intervals of duration T at a time determined by a sequential one of a set of independent random numbers having a uniform probability density in a region bounded by zero and T, and processing means to perform a signal processing operation in response to the jittered pulses.

The random numbers may be indicated by a random signal provided by a random signal generator. The generator includes a noise signal source, a reference signal source, reference signal correction means that keeps the difference between the reference signal and the noise signal within a bracket amount, and a comparator to provide the random signal by comparing the noise signal with the reference signal.

The jittered pulses may be provided by delay means which delays sequential ones of a sequence of clock pulses provided by a clock source and having a period T for sequential ones of a set of time intervals determined by the random numbers. In an alternate embodiment the jittered pulses may be provided by digital processing means.

The delay means may comprise a random signal selector to select from the random signal a selected signal indicative of one of the random numbers, a ramp signal source, and comparator means to provide a jittered pulse when the ramp signal reaches a value equal to the value of the selected signal.

In one embodiment the processing means may comprise means for sampling an input signal when a jittered pulse is provided. Logic means provides a signal indicative of the time at which the jittered pulse is provided.

In another embodiment the processing means may comprise frequency synthesis means for synthesizing a signal having a desired frequency as specified by an external control signal. The synthesis means may comprise an accumulator or a fractional divider. Phase interpolator means or sine wave generation means may also be provided.

Phase noise which may be introduced into the output signal from the synthesis means can be reduced by scaling the external control signal according to the time intervals between sequential ones of the jittered pulses.

Setup time aliasing which might be introduced into the output signal provided by the synthesis means can be eliminated by jittering each of a sequence of carry pulses coming out of the synthesis means rather than jittering the clock pulses as they go in.

In another embodiment, setup time aliasing is avoided by alternating back and forth between two out-of-phase processing means, each driven by its own jittered pulses. The first processing means is driven by a first sequence of jittered pulses, each of which occurs during a predefined portion of one of a first sequence of time intervals of duration 2T at a time determined by a sequential one of a first set of random numbers. Since none of the random numbers can exceed T, there is a minimum time interval T between consecutive jittered pulses. The second processing means is driven by a second sequence of jittered pulses which are derived in a similar manner.

The first and second sequences of jittered pulses may be provided by a clock source that provides two phase-related sequences of clock pulses, each having a period 2T, and two delay means, one to provide the first sequence of jittered pulses by delaying pulses of the first sequence of clock pulses and one to provide the second jittered pulses by delaying pulses of the second sequence of clock pulses.

It will be appreciated from the foregoing that the present invention represents a significant advance in signal processing in that easily-realizable signal processing circuitry greatly reduces the effects of unwanted alias frequencies. Other aspects and advantages of the invention will become apparent from the following more detailed description taken in conjunction with the accompanying drawings.

BRIEF DESCRIPTION OF THE DRAWINGS

FIG. 7 is a block diagram of an embodiment of block 217 of FIG. 4 comprising a sine wave generator;

FIG. 8 is a block diagram of a reduced-alias frequency synthesizer similar to the apparatus of FIG. 1 and including provisions for avoiding setup time aliasing;

DESCRIPTION OF THE PREFERRED EMBODIMENT

Figure 1:
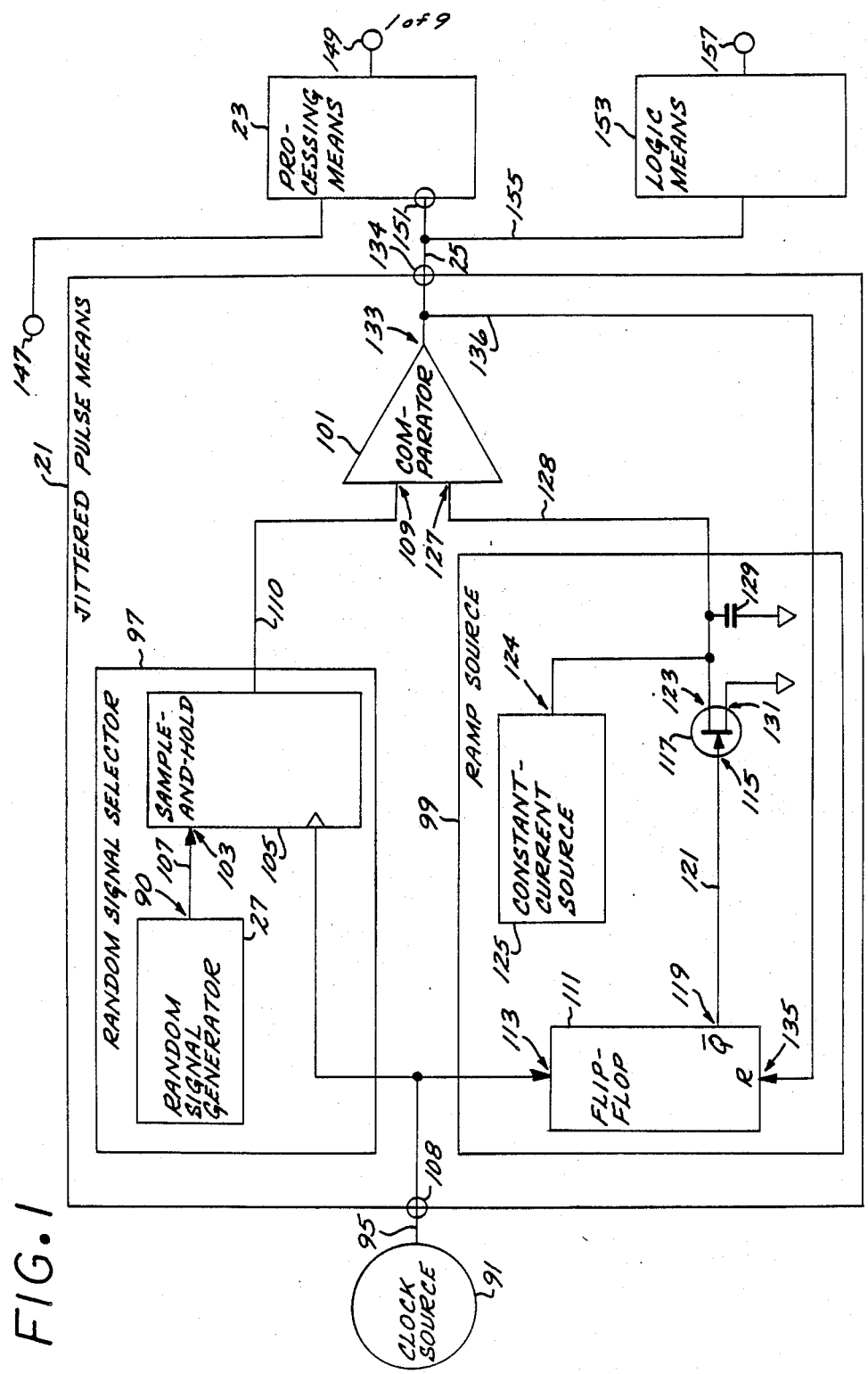
FIG. 1 is a block diagram of a reduced-alias signal processing apparatus according to the invention.

As shown in the drawings for purposes of illustration, the invention is embodied in a novel method and apparatus for reducing aliasing in digital signal processing. Present digital signal processing techniques generally require an operation such as sampling or incrementing to be perfomed periodically at regularly spaced intervals of time. However, an inherent result of performing such operations at regular time intervals is the introduction of unwanted "alias" frequencies into the signal being processed, and in applications requiring a high degree of spectral purity these techniques have therefore been found to be inadequate.

In accordance with the invention, a sequence of jittered pulses is provided, each pulse occurring during one of a sequence of time intervals of duration T at a time determined by a sequential one of a set of independent random numbers having a uniform probability density in a region bounded by zero and T. These jittered pulses control the time of occurrence of a signal processing operation such as sampling or incrementing and thereby reduce the incidence of unwanted alias frequencies in the signal being processed.

Optimum results are obtained by allowing the random numbers to assume any value in the defined region, but in many instances allowing the numbers to assume only a discrete quantity of such values is sufficient to reduce any unwanted alias frequencies to a negligible level. In some applications, a repeating pseudorandom sequence of numbers in the defined region, as might be provided by digital computing means, provides good results.

Reduced-alias signal processing apparatus according to the invention comprises jittered pulse means 21, operative to provide a sequence of jittered pulses of the kind described above, and processing means 23 in electrical communication with the jittered pulse means 21 as indicated by a line 25, as shown in FIG. 1. The processing means 23 is operative to perform a signal processing operation in response to the jittered pulses provided by the jittered pulse means 21.

Figure 2:
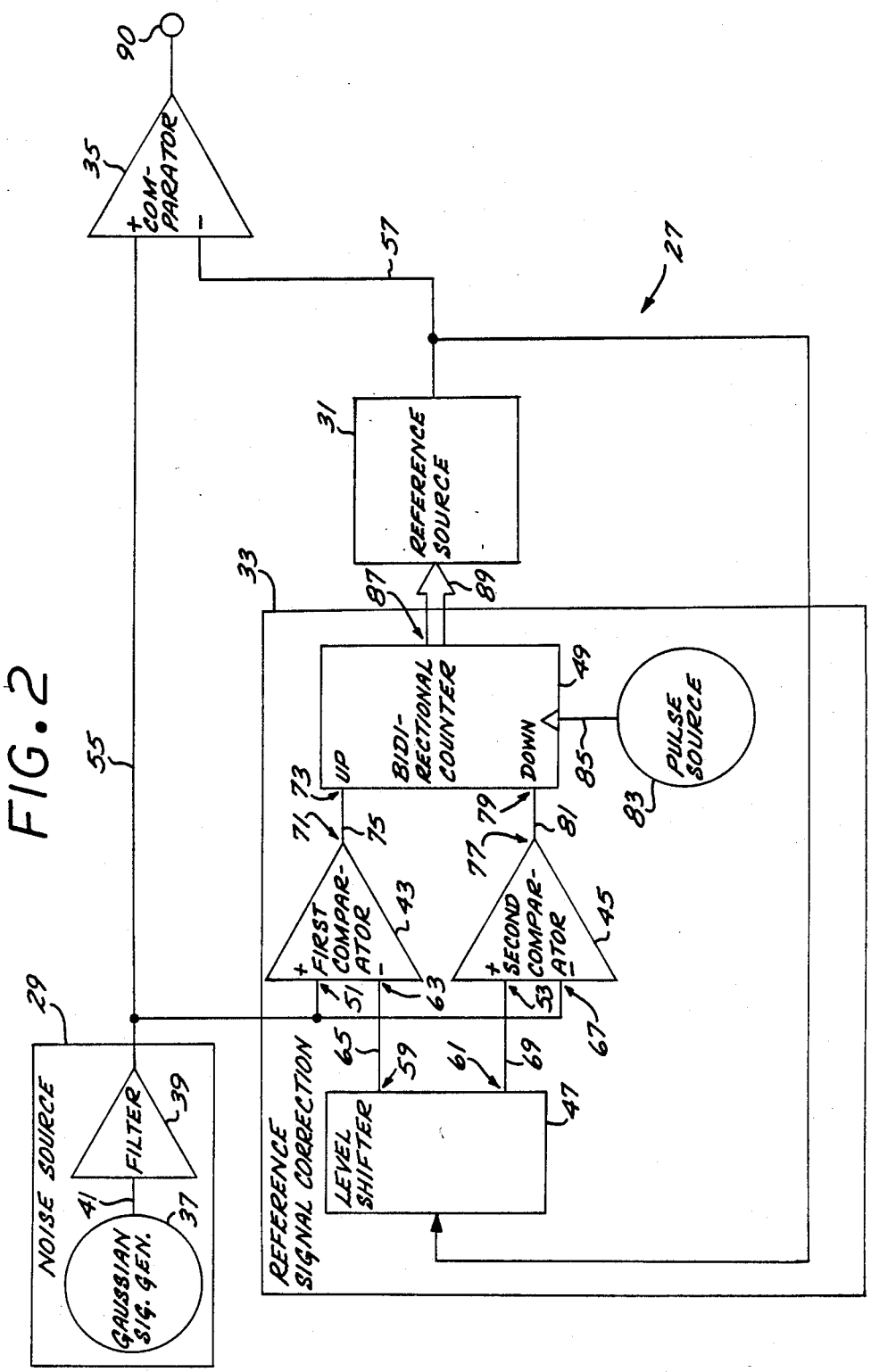
FIG. 2 is a block diagram of block 27 of FIG. 1 comprising a random signal generator.

The random numbers needed to determine the occurrence times of the jittered pulses are indicated by a random signal provided by a random signal generator 27, as shown in more detail in FIG. 2. A noise source 29 provides a noise signal having a randomly varying value. A reference source 31 provides a reference signal. Reference signal correction means 33, having a first input in electrical communication with the noise source 29 and a second input in electrical communication with the reference source 31, generates a correction signal if the absolute value of the difference between the noise signal and the reference signal exceeds a bracket amount, the correction signal tending to change the value of the reference signal so as to reduce the absolute value of said difference. Comparator means 35, in electrical communication with the noise source 29 and with the reference source 31, provides the random signal by comparing the value of the reference signal with the value of the noise signal.

The noise source 29 may comprise a Gaussian signal generator 37 which provides a time-varying signal characterized by a Gaussian distribution of frequencies. The generator 37 is connected to an input of a low pass filter 39 as indicated by a line 41. The filter 39 provides the noise signal by removing from the time-varying signal any frequencies which are too high for the reference signal correction means 33.

The reference signal correction means 33 may comprise a first comparator 43, a second comparator 45, a level shifter 47, and a bidirectional counter 49. An output of the filter 39 is connected to a positive input 51 of the first comparator 43 and to a negative input 53 of the second comparator 45 as indicated by a line 55. An output of the reference source 31 is connected to an input of the level shifter 47 as indicated by a line 57.

The level shifter 47 provides at a first output 59 a first shifted signal having a level that is higher than the level of the reference signal by a bracket amount and at a second output 61 a second shifted signal having a level that is lower than the level of the reference signal by said bracket amount. The first output 59 is connected to a negative input 63 of the first comparator 43 as indicated by a line 65. The second output 61 is connected to a positive input 67 of the second comparator 45 as indicated by a line 69.

The first comparator 43 has an output 71 connected to a "count up" input 73 of the bidirectional counter 49 as indicated by a line 75. The second comparator has an output 77 connected to a "count down" input 79 of the counter 49 as indicated by a line 81.

If the value of the noise signal is higher than the value of the first shifted signal (corresponding to a condition where the level of the noise signal is higher than that of the reference signal by the bracket amount), the first comparator 43 generates an "up" signal. Conversely, if the value of the noise signal is lower than the value of the second shifted signal (corresponding to a condition where the level of the noise signal is lower than that of the reference signal by the bracketing amount), the second comparator 45 generates a "down" signal.

The counter 49 is driven by a series of pulses from a pulse source 83 connected to a clock input of the counter 49 as indicated by a line 85. The counter 49 counts upward when an "up" signal is presented and downward when a "down" signal is presented, and it generates at an output 87 a digital signal indicative of its count. This digital signal serves as the correction signal. The output 87 is connected to an input of the reference source 31 as indicated by a multi-conductor line 89.

If an "up" signal is presented to the counter 49, indicating that the value of the noise signal is higher than that of the reference signal by the bracket amount, the counter 49 counts upward, thereby providing an increasing correction signal to the reference source 31. The reference source 31, which may comprise a digital-to-analog converter, responds to an increasing correction signal by increasing the level of the reference signal sufficiently to cause the first comparator 43 to stop giving an "up" command, which in turn causes the counter 49 to stop counting upward.

Conversely, if a "down" signal is presented to the counter 49, indicating that the value of the noise signal is lower than that of the reference signal by the bracket amount, the counter 49 counts downward, thereby providing a decreasing correction signal. The reference source 31 responds to a decreasing correction signal by lowering the level of the reference signal sufficiently to cause the second comparator 45 to stop giving a "down" signal, which in turn causes the counter 49 to stop counting downward. In this way, the difference between the level of the reference signal and that of the noise signal is kept within a bracketed region having limits defined by the bracket amount.

A first input of the comparator 35 is connected to the output of the reference source 31 as indicated by the line 57. A second input of the comparator 35 is connected to the output of the filter 39 as indicated by the line 55. The comparator 35 subtracts the value of the reference signal from that of the noise signal to provide the random signal at an output port 90. Since the level of the reference signal gets shifted up or down as necessary to keep the difference between the reference signal and the noise signal within the bracketed region, the magnitude of the difference signal will not exceed the limits of said region.

In other words, the only fluctuations in the noise signal which will be found in the random signal are fluctuations having a magnitude bounded by the bracketed region. It can be shown mathematically that the magnitudes of these fluctuations comprise a set of random numbers having a uniform probability density within said region, and hence the magnitudes of the fluctuations in the random signal are indicative of a set of independent random numbers having a uniform probability density within the bracketed region.

The only remaining step needed to cause the random numbers as indicated by the random signal to satisfy the requirement for a uniform probability density in a region bounded by zero and T is to establish an upper limit equal to T and a lower limit equal to zero for the bracketed region. This can be done, for example, by appropriate choices of circuit parameters.

Signal processing apparatus according to the invention may comprise a clock source 91, operative to provide a sequence of clock pulses characterized by a period of duration T to define the sequence of time intervals, as shown in FIG. 1. The jittered pulse means 21 may comprise delay means, in electrical communication with the clock source 91 as indicated by a line 95, operative to provide the jittered pulses by delaying sequential ones of the clock pulses for sequential ones of a set of time intervals determined by the random numbers.

A preferred embodiment of the delay means comprises a random signal selector 97, in electrical communication with the clock source 91, operative to generate a random signal indicative of the random numbers and responsive to a clock pulse to provide a selected signal having a value determined by the random signal; a ramp source 99, in electrical communication with the clock source 91, responsive to a clock pulse to provide a ramp signal which begins at an initial value and increases at a constant rate; and comparator means 101 in electrical communication with the ramp source 99 and with the random signal selector 97 to provide a jittered pulse when the value of the ramp signal equals the value of the selected signal.

The random signal selector 97 may comprise a signal generator such as the random signal generator 27 to provide the random signal. The output port 90 of the generator 27 is connected to a data input 103 of a sample-and-hold 105 as indicated by a line 107. The clock source 91 is connected to a clock input port 108 as indicated by the line 95. A clock input of the sample-and-hold 105 is connected to the input port 108. An output of the sample-and-hold 105 is connected to a first input 109 of the comparator 101 as indicated by the line 110. When a clock pulse is provided, the value of the random signal at that moment is held by the sampleand-hold 105 and is provided as the selected signal to the first input 109 of the comparator 101.

The ramp source 99 may comprise an R-S flip-flop 111 having a "set" input 113 connected to the clock input port 108. A gate 115 of a transistor 117 is connected to a Q-bar output 119 of the flip-flop 111 as indicated by a line 121. A source input 123 of the transistor 117 is connected to an output 124 of a constant-current source 125 and to a second input 127 of the comparator 101 as indicated by a line 128. A capacitor 129 is connected between the source input 123 and ground. A drain 131 of the transistor 117 is connected to ground. An output 133 of the comparator 101 is connected to an output port 134 and to a "reset" input 135 of the flip-flop 111 as indicated by a line 136.

Initially the flip-flop 111 is in a "reset" condition and a "high" signal level from the output 119 is applied to the gate 115, turning on the transistor 117. When the transistor 117 is turned on, the capacitor 129 is effectively short-circuited and electrical current from the current source 125 flows through the transistor 117 to ground.

When a clock pulse is received at the "set" input 113, the flip-flop 111 is "set" and the output 119 assumes a "low" level, causing the transistor 117 to turn off. The electrical current from the current generator 125 now flows into and charges the capacitor 129 at a constant rate. As the capacitor 129 charges, an increasing voltage develops across the capacitor 129 and is provided as the ramp signal to the second input 127 of the comparator 101.

When a clock pulse occurs, a selected signal is provided to the first input 109 of the comparator 101. At the same time, the ramp signal being provided to the second input 127 of the comparator 101 begins to increase from its minimum value as the capacitor 129 charges. When the ramp signal reaches the same value as the selected signal, the comparator 101 provides an output signal at the output port 134.

The output signal resets the flip-flop 111, thereby turning on the transistor 117 and discharging the capacitor 129. As a result, the ramp signal returns to its minimum value and the output signal vanishes. The output signal, in other words, takes the form of a short pulse.

The circuit remains quiescent until the next clock pulse arrives, again causing the selector 97 to provide another selected signal and again starting the ramp signal. When the ramp signal reaches the value of the selected signal, another short pulse is provided by the comparator 101.

A sequence of "jittered" pulses is thereby provided, the time of occurrence of each jittered pulse being determined by the length of time it takes for the capacitor 129 to charge to a voltage equal to the voltage then being provided as the selected signal by the selector 97. Since the selected signal varies randomly within a region bounded by zero and T, each jittered pulse will have been delayed for a sequential one of a set of time intervals that vary randomly in duration between zero and T.

Figure 3:
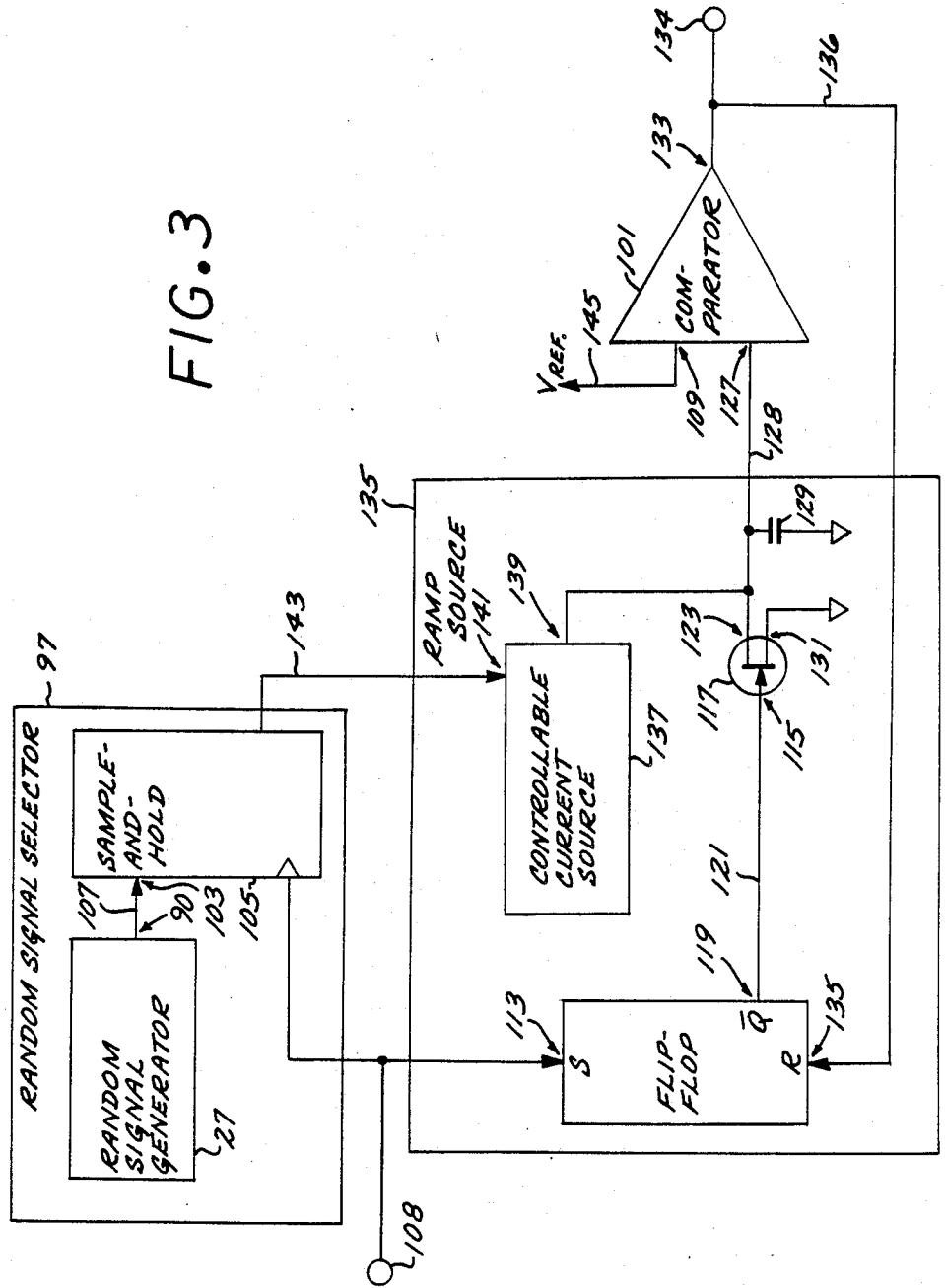
FIG. 3 is a block diagram of an alternate embodiment of block 21 of FIG. 1 comprising delay means.

An alternate embodiment of the jittered pulse means 21 is shown in FIG. 3. This embodiment is similar in many respects to the embodiment shown in FIG. 1, and for convenience components in FIG. 3 that are similar to components in FIG. 1 are assigned the same reference numerals and different components are assigned different reference numerals.

In the alternate embodiment, the ramp source 99 of FIG. 1 has been replaced with a ramp source 135 having a controllable current source 137. The current source 137 has an output 139 connected to the source input 123 of the transistor 117. The output of the selector 97 is connected to an input 141 of the current source 137 as indicated by a line 143, rather than to the first input 109 of the comparator 101 as was the case in FIG. 1. The first input 109 of the comparator 101 is connected to a reference voltage as indicated by a line 145.

The operation of the circuit shown in FIG. 3 is similar to the operation of the circuit shown in FIG. 1 except that when the ramp signal begins to increase in response to a clock pulse, it increases at a rate determined by the value of the selected signal rather than at a fixed rate as was the case in the circuit of FIG. 1. When the value of the ramp signal becomes equal to the value of the reference voltage, a jittered pulse is provided.

A sequence of jittered pulses is thereby provided, the time of occurrence of each jittered pulse being determined by the length of time it takes for the capacitor 129 to charge to a voltage equal to the reference voltage. The rate at which the capacitor 129 charges is controlled by the signal then being provided to the current source 137 by the selector 97. Since the selected signal varies randomly within a region bounded by zero and T, each jittered pulse will have been delayed for a sequential one of a set of time intervals that vary randomly in duration between zero and T. In this way, the alternate embodiment of the jittered pulse means as shown in FIG. 3 provides a sequence of jittered pulses having characteristics similar to the jittered pulses provided by the jittered pulse means as shown in FIG. 1.

The selected signal may be provided to the current source 137 in analog or digital form. One way to provide the signal in digital form is to insert an analog-to-digital converter between the output of the sample-and-hold 105 and the input of the current source 137 to convert the selected signal into digital form. If the selected signal is provided in digital form, the current source 137 may be implemented, for example, by a digital-to-analog converter having a current output. Another way to provide the selected signal in digital form would be to use digital computation means, rather than the random signal generator 27, to compute the random numbers and to provide a signal indicative thereof.

In an alternate embodiment of the jittered pulse means 21, the jittered pulse means may comprise digital processing means such as a digital computer or the like. The jittered pulse may be determined in such a device by realtime computation or by means of data stored in memory means comprised in the digital processing means.

A signal input port 147 of the processing means 23 receives an input signal. A signal output port 149 of the processing means 23 provides an output signal. A pulse input port 151 of the processing means 23 is connected to the output port 134 of the jittered pulse means 21 to receive the jittered pulses.

In sampling apparatus embodying the invention, the processing means 23 may comprise sampling means, such as an analog-to-digital converter, for sampling an input signal received at the input port 147, the sampling means being operative to provide an output signal at the output port 149 indicative of the value of the input signal when a jittered pulse is provided.

The sampling apparatus may also include logic means 153 to provide a timing signal indicative of the time at which the jittered pulse is provided. The logic means 153 is connected to the output port 134 of the jittered pulse means 21 as indicated by a line 155. The timing signal is provided at an output port 157.

In a frequency synthesizer embodying the invention, the processing means 23 may comprise synthesis means, operative to synthesize an output signal having a desired frequency as specified by an externally provided control signal. The synthesis means receives the control signal through the input port 147 and provides the synthesized signal at the output port 149.

Figure 4:
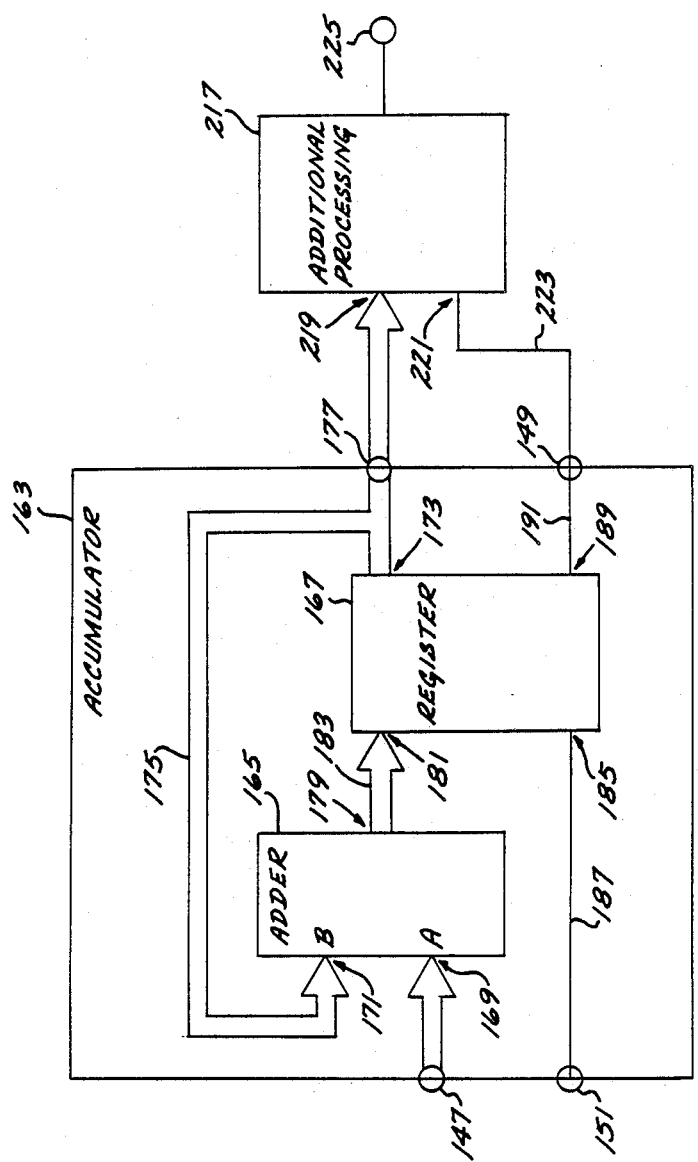
FIG. 4 is a block diagram of an embodiment of block 23 of FIG. 1 comprising an accumulator and including an additional processing circuit.

In a preferred embodiment, the synthesis means comprises an accumulator 163 as shown in FIG. 4. The accumulator, which may comprise an adder 165 and a register 167, provides a carry pulse each time a number of jittered pulses determined by the control signal have been provided. The carry pulses constitute the output signal.

More particularly, the input port 147 is connected to an "A" input 169 of the adder 165. A "B" input 171 of the adder 165 is connected to a register output 173 of the register 167 as indicated by a multi-conductor line 175. The register output 173 is also connected to a register output port 177 to provide a phase signal if needed by an additional processing circuit such as a phase interpolator or a sine wave generator as discussed below. A summing output 179 of the adder 165 is connected to an input 181 of the register 177 as indicated by a multi-conductor line 183. The pulse input port 151 is connected to a clock input 185 of the register 167 as indicated by a line 187. A carry output 189 of the register 167 is connected to the output port 149 as indicated by a line 191.

Upon receiving a jittered pulse, the register 167 stores data indicative of the signal then being provided at the summing output 179 of the adder 165. A short time later, the register 167 provides at its register output 173 a stored signal indicative of the stored data, and this signal is provided to the "B" input 171 of the adder 165. The adder 165 thereupon adds the stored signal to the control signal to provide a new sum signal at the summing output 179. Upon receipt of the next jittered pulse, data indicative of this new sum signal are stored in the register 167. Each time the capacity of the register 167 is exceeded, the register 167 provides a carry pulse at the output port 149.

Figure 5:
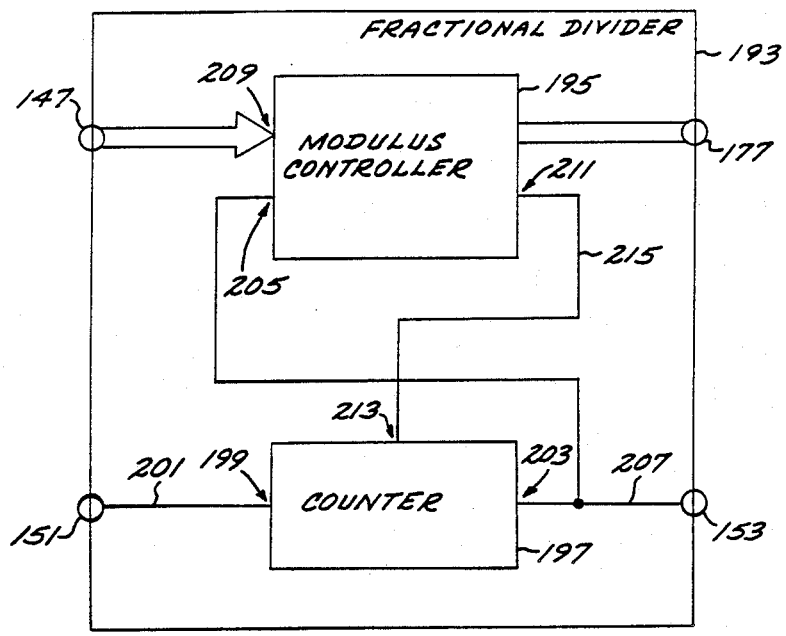
FIG. 5 is a block diagram of an embodiment of block 23 of FIG. 1 comprising a fractional divider.

In an alternate embodiment, the synthesis means comprises a fractional divider 193 as shown in FIG. 5. The fractional divider 193, which includes a modulus controller 195 and a counter 197, provides a carry pulse each time a number of jittered pulses determined by the control signal have been provided. The carry pulses constitute the output signal.

The counter 197 comprises a controllable modulus counter such as a divide by N/divide by N+1 counter. A clock input 199 of the counter 197 is connected to the pulse input port 151 as indicated by a line 201. A carry pulse output 203 of the counter 197 is connected to the output port 149 and to a carry pulse input 205 of the controller 195 as indicated by a line 207.

The controller 195 may comprise an accumulator. A control input 209 of the controller 195 is connected to the input port 147. A modulus output 211 of the controller 195 is connected to a modulus control input 213 of the counter 197 as indicated by a line 215.

The counter 197 provides a carry pulse at the output port 149 each time a number of jittered pulses equal to the modulus of the counter 197 have been received. When a number of carry pulses determined by the control signal has been received at the input 205 of the controller 195, a modulus control signal is provided at its output 211. When the counter 197 receives the modulus control signal, its modulus is temporarily changed, for example from N to N+1. The modulus control signal thereby determines the number of jittered pulses required to produce a carry pulse.

In other embodiments of the synthesis means, an additional processing circuit 217 may be provided as shown in FIG. 4. A phase input port 219 of the circuit 217 is connected to the register output port 177 of the accumulator 163 to receive the phase signal. A pulse input port 221 of the circuit 217 is connected to the output port 149 as indicated by a line 223. A final output signal is provided at a final output port 225 of the circuit 217.

In one embodiment, the additional processing circuit 217 comprises a phase interpolator for the purpose of reducing any phase deviations in the carry pulses being provided at the output port 149. When a carry pulse is provided by a synthesizer such as the accumulator 163, the value stored in the register 177 is proportional to any phase deviation between the actual carry pulse output of the synthesizer and an ideal output at the desired frequency. The phase interpolator makes use of this fact in reducing any such phase deviations in the carry pulses to provide the final output signal.

The phase interpolator may comprise a digital-to-phase converter, a phase locked loop, or other means for reducing said phase deviation.

Figure 6:
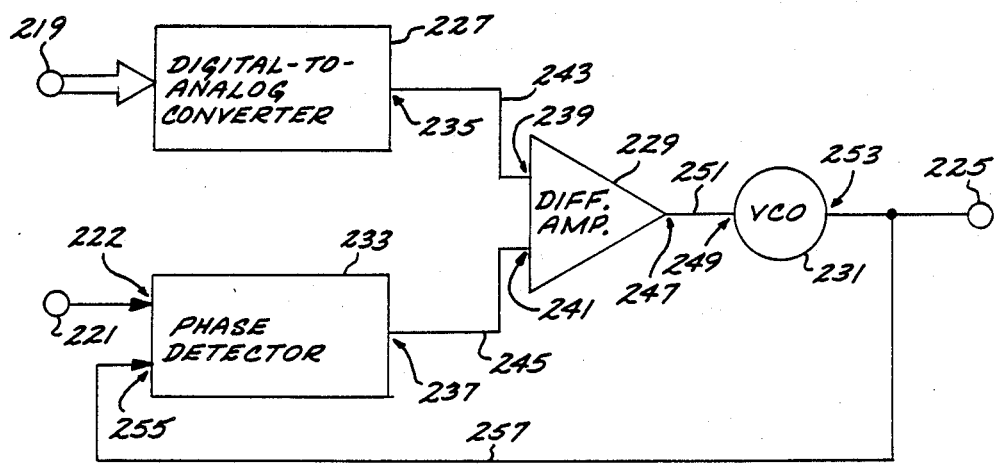
FIG. 6 is a block diagram of an embodiment of block 217 of FIG. 4 comprising a phase locked loop.

A phase locked loop which can serve as the phase interpolator includes a digital-to-analog converter 227, a differential amplifier 229, a voltage-controlled oscillator 231, and a phase detector 233, as shown in FIG. 6. The phase input port 219 is connected to an input of the converter 227. The pulse input port 221 is connected to a first input 222 of the phase detector 233. An output 235 of the converter 231, and an output 237 of the phase detector 233, are connected to first and second inputs 239 and 241 of the amplifier 229, as indicated by lines 243 and 245, respectively. An output 247 of the amplifier 229 is connected to an input 249 of the oscillator 231, as indicated by a line 251. An output 253 of the oscillator 231 is connected to the final output port 225 and to a second input 255 of the phase detector 233, as indicated by a line 257.

The converter 227 provides at its output 235 a signal indicative of the phase signal. The phase detector 233 provides at its output 237 a signal indicative of any difference between the frequency of the oscillator 231 and the frequency of the carry pulses. The differential amplifier 229 subtracts its two input signals to provide an error signal to control the frequency of the oscillator 231. In response to the error signal, the oscillator 231 provides the final output signal having the desired frequency.

In another embodiment, the additional processing circuit 217 comprises sine wave generation means for providing a sine wave output signal. The sine wave generation means may comprise a sine wave converter 261 and a digital-to analog converter 263 as shown in FIG. 7. The phase input port 219 is connected to a phase input 265 of the sine wave converter 261. A digital sine output 267 of the sine wave converter 261 is connected to a digital input 269 of the digital-to-analog converter 263. The digital-to-analog converter 263 provides an output sine wave signal at the output port 225.

The sine wave converter 261 receives the phase signal from the accumulator 163 through the phase input port 219. and provides at its output 267 a digital sine signal indicative of a point on a sine wave according to the value of the phase signal. The sine wave converter 261 may comprise, for example, digital computation means for computing the digital sine signal, or it may comprise memory means for storing a lookup table or the like for determining the digital sine signal. The digital sine signal is converted into an analog signal by the digital-to-analog converter 263.

The duration of the time intervals between successive jittered pulses varies randomly between zero and 2T. However, a physically realizable processing means 23 generally requires a finite minimum setup time before performing a processing operation, and therefore successive jittered pulses must as a practical matter be separated from each other by a time interval at least as long as this minimum setup time. The effect of including such a minimum time interval between successive pulses is to introduce unwanted "setup time" alias frequencies into the output, and although these "setup time" alias frequencies are usually of less magnitude than the alias frequencies which result from the use of regularly-spaced time intervals between pulses, it is preferable to avoid them entirely.

The occurrence of setup time alias frequencies in the output of a frequency synthesizer embodying the invention can be prevented by randomly delaying output signal pulses as they come out of the synthesizer rather than clock pulses as they go in. Delaying the output pulses reduces aliasing to the same extent as does delaying the clock pulses but without introducing "setup time" alias frequencies.

A reduced-alias frequency synthesizer characterized by means for delaying its output pulses rather than its clock pulses synthesizes an output signal having a desired frequency as specified by an externally provided control signal, as shown in FIG. 8. The synthesizer includes a clock source 271 to provide a sequence of clock pulses having a period of duration T; synthesis means 273, in electrical communication with the clock source 271, responsive to the clock pulses and to the control signal to synthesize a sequence of carry pulses; and delay means 275, in electrical communication with the synthesis means 273, responsive to the carry pulses to provide an output signal having the desired frequency by delaying sequential ones of the carry pulses for sequential ones of a set of time intervals determined by a set of independent random numbers having a uniform probability density in a region bounded by zero and T.

The control signal is received by the synthesis means 273 through a control input port 277. The clock source 271 is connected to a clock input port 279 of the synthesis means 273 as indicated by a line 281. A carry pulse output port 283 of the synthesis means 273 is connected to an input 285 of the delay means 275 as indicated by a line 287. An output 289 of the delay means 275 is connected to a signal output port 291 as indicated by a line 293. The output signal is provided at the signal output port 291.

The delay means 275 may comprise a circuit similar to that of any of the jittered pulse or delay means previously disclosed, except that the delay means 275 is operative to delay the carry pulses from the synthesis means 273 rather than clock pulses from a clock source.

An additional processing circuit 295, similar to the processing circuit 217 of FIG. 4, may also be provided. The processing circuit 295 may comprise, for example, a phase interpolator or a sine wave generator. A phase input port 297 of the circuit 295 is connected to a register output port 299 of the synthesis means 273. A pulse input port 301 of the circuit 295 is connected to the output 289 of the delay means 275. A final output signal is provided by the circuit 217 at a final output port 303.

The quality of the signals obtainable from the above-described synthesizers embodying the invention is limited by phase noise introduced into the output signal by jittering the clock pulses or the carry pulses while the externally provided control signals remains constant. This phase noise can be reduced by a phase correcting technique that comprises scaling the control signal each time a jittered pulse is provided according to the duration of the time interval between that pulse and its predecessor.

Figure 9:
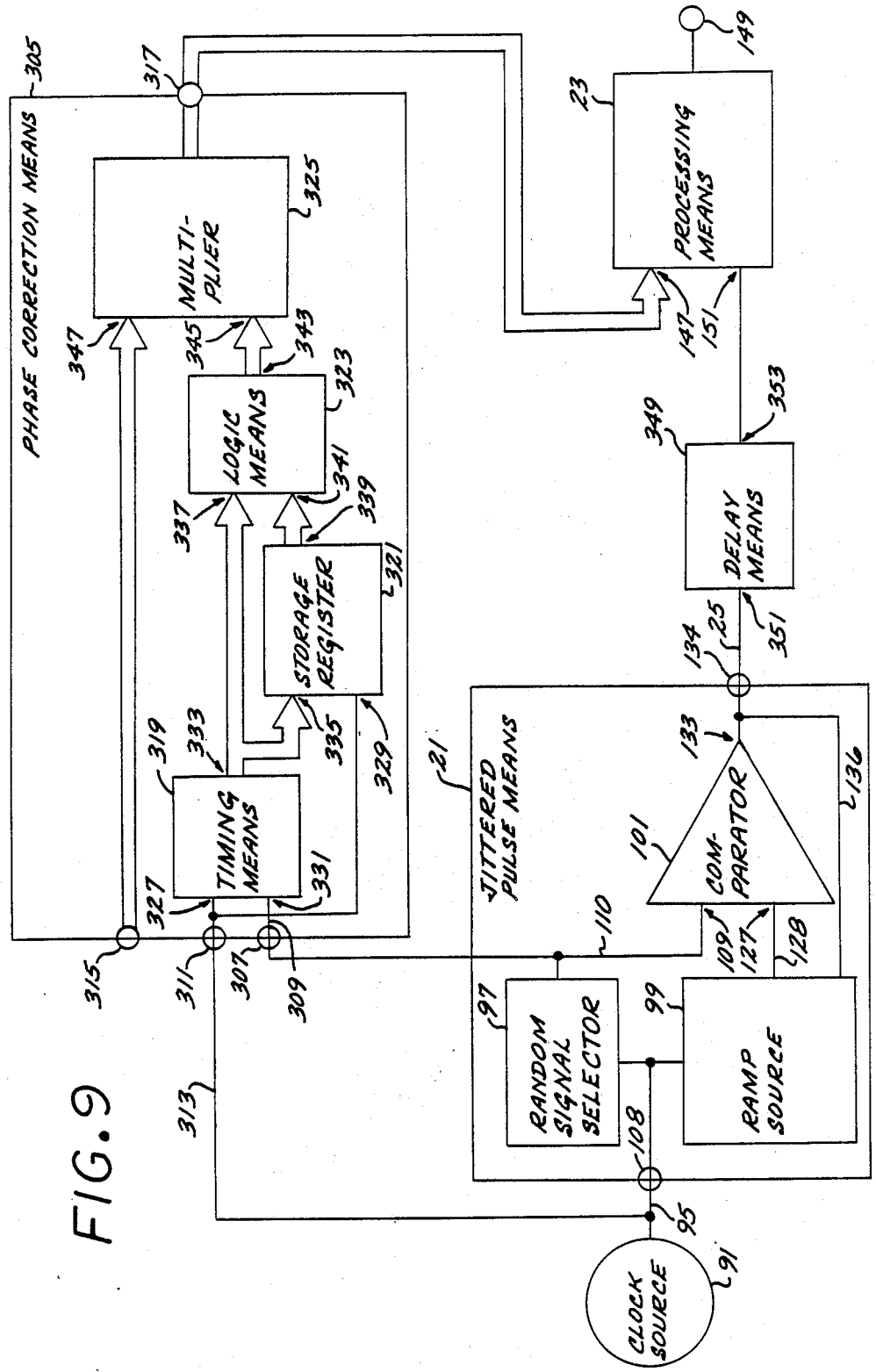
FIG. 9 is a block diagram of a reduced-alias frequency synthesizer similar to the apparatus of FIG. 1 and including phase correction means.

A frequency synthesizer according to the invention and providing such phase correction is shown in FIG. 9. This embodiment is similar to that shown in FIG. 1, except for the phase correction feature, and for convenience components in FIG. 9 that are similar to components in FIG. 1 are assigned the same reference numerals.

Phase correction means 305, in electrical communication with the jittered pulse means 21, provides a phase corrected control signal by scaling the externally provided control signal according to the time intervals between sequential ones of the jittered pulses. A selected signal input port 307 of the phase correction means 305 is connected to the output of the random signal selector 97 as indicated by the line 309. A clock pulse input port 311 of the phase correction means 305 is connected to the clock source 91 as indicated by the line 313. A control signal input port 315 of the phase correction means 305 receives the externally provided control signal. An output port 317 of the phase correction means 305 is connected to the signal input port 147 of the processing means 23.

The phase correction means 305 includes timing means 319, a storage register 321, logic means 323, and a multiplier 325. A clock input 327 of the timing means 319, and a clock input 329 of the register 321, are connected to the clock pulse input port 311. A signal input 331 of the timing means 319 is connected to the selected signal input port 307. A digital output 333 of the timing means 319 is connected to a storage input 335 of the register 321 and to a first logic input 337 of the logic means 323. A storage output 339 of the register 321 is connected to a second logic input 341 of the logic means 323. An output 343 of the logic means 323 is connected to a first input 345 of the multiplier 325. A second input 347 of the multiplier 325 is connected to the control signal input port 315. An output 349 of the multiplier 325 is connected to the output port 317.

The timing means 319 provides a time signal indicative of the time at which a jittered pulse occurs. The time signal is provided to the first logic input 337 and to the register 321. The register 321 stores the time signal until the succeeding clock pulse and then provides the stored signal to the second logic input 341. Thus, after the nth clock pulse the logic means 323 is receiving at its first input 337 a signal indicating the time of occurrence of the nth jittered pulse and at its second input 341 a signal indicating the time of occurrence of the (n-1)th jittered pulse. From these two signals, the logic means 323 derives a phase correction signal indicative of the duration of time between the nth jittered pulse and its predecessor. This phase correction signal is provided to the first input 345 of the multiplier 325.

The externally provided control signal is received at the second input 347 of the multiplier 325 and is scaled according to the value of the phase correction signal. The scaled signal which results is provided at the output port 317 and serves as the phase corrected control signal which is provided to the processing means 323.

The timing means 319 may comprise a cumulative timer and a latch. The latch is responsive to the nth selected signal to provide, as the time signal, the value of the elapsed time provided by the timer at the moment the nth jittered pulse occurs. Or the timing means 319 may comprise an analog-to-digital converter which provides, as the time signal, a digital representation of the selected signal. If the selected signal is provided in digital form by the jittered pulse means 21, the timing means 319 may be omitted entirely and the digital selected signal provided directly to the storage input 335 of the register 321 and to the first input 337 of the logic means 323.

A delay means 349 may be provided to delay the jittered pulses for the length of time needed for the phase correction means 305 to provide the phase corrected control signal. An input 351 of the delay means 349 is connected to the output port 134 of the jittered pulse means, and an output 353 of the delay means 349 is connected to the pulse input 151 of the processing means 23. The delay means delays the jittered pulses so that each jittered pulse arrives at the processing means 23 not earlier than the corresponding phase corrected control signal.

Figure 10:
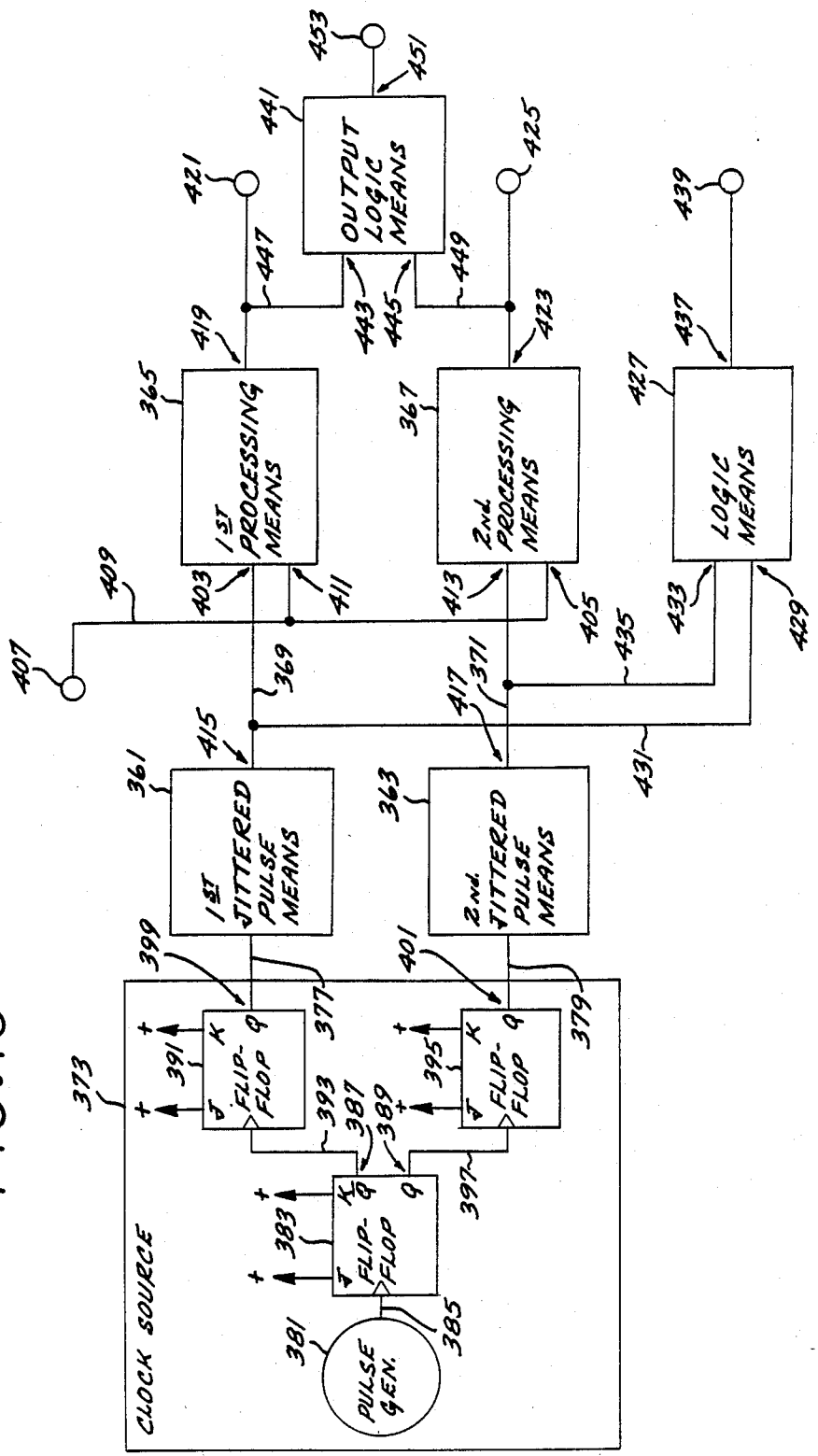
FIG. 10 is a block diagram of a reduced-alias signal processing apparatus similar to the apparatus of FIG. 1 and including a dual clock generator and dual processing means.

In an alternate embodiment of the invention, setup time aliasing is prevented by switching back and forth between two processing means operating out of phase with each other in a dual clock configuration. More particularly, a dual clock reduced-alias signal processing apparatus according to the invention comprises two jittered pulse means 361 and 363 and two processing means 365 and 367, as shown in FIG. 10.

First jittered pulse means 361 provides a first sequence of jittered pulses, each pulse occurring during a predefined portion of one of a first sequence of time intervals of duration 2T at a time determined by a sequential one of a first set of independent random numbers having a uniform probability density in a region bounded by zero and T.

Second jittered pulse means 363 provides a second sequence of jittered pulses similar to the first sequence, each pulse of the second sequence occurring during a predefined portion of one of a second sequence of time intervals of duration 2T at a time determined by a sequential one of a second set of independent random numbers having a uniform probability density in a region bounded by zero and T. The second sequence of time intervals has a predetermined phase relationship with the first sequence of time intervals.

First processing means 365, in electrical communication with the first jittered pulse means 361 as indicated by a line 369, performs a signal processing operation in response to jittered pulses of the first sequence. Second processing means 367, in electrical communication with the second jittered pulse means 363 as indicated by a line 371, performs a signal processing operation in response to jittered pulses of the second sequence.

The first set of random numbers may be derived independently of the second set, or both may be derived from a single random number source.

Although the duration of each time interval in the first sequence is 2T, each jittered pulse in the first sequence only occurs during a portion of its associated time interval at a time determined by a random number in a region bounded by zero and T. Thus, the time between successive jittered pulses in the first sequence is not less than T nor more than 3T, and the same is true of jittered pulses in the second sequence. Provided the processing means 365 and 367 do not require a setup time longer than T, there will be no "setup time" alias frequencies in the outputs of the processing means 365 and 367.

The first jittered pulse means 361 may comprise any of the previously-discussed embodiments of jittered pulse means, as may the second jittered pulse means 363. Both the first and the second jittered pulse means 361 and 363 may be comprised in digital processing means, or each may comprise a clock source and a delay means.

A preferred embodiment of a dual-clock signal processing apparatus according to the invention comprises a clock source 373, operative to provide a first sequence of clock pulses characterized by a period of duration 2T and a second sequence of clock pulses characterized by a like period and having a predetermined phase relationship to the first sequence.

The first jittered pulse means 361 may comprise delay means, in electrical communication with the clock source 373 as indicated by a line 377, operative to provide the first sequence of jittered pulses by delaying sequential ones of the first sequence of clock pulses for sequential ones of a set of time intervals determined by the first set of random numbers. Likewise, the second jittered pulse means 363 may comprise delay means, in electrical communication with the clock source 373 as indicated by a line 379, operative to provide the second sequence of jittered pulses by delaying sequential ones of the second sequence of clock pulses for sequential ones of a set of time intervals determined by the second set of random numbers.

The clock source 373 may comprise, for example, an I and Q clock generator having a pulse generator 381 to provide a sequence of pulses having a period T/2. The generator 381 is connected to a clock input of a J-K flip-flop 383 as indicated by a line 385. A first sequence of pulses having a period T appears at a Q-bar output 387 of the flip-flop 383, and a second sequence of pulses having the same period but 180 degrees out of phase with the first sequence appears at a Q output 389 of the flip-flop 383.

The Q-bar output 387 of the flip-flop 383 is connected to a clock input of a second J-K flip-flop 391 as indicated by a line 393. The Q output 389 of the flip-flop 383 is connected to a clock input of a third J-K flip-flop 395, as indicated by a line 397. All J and K inputs of the three flip-flops 383, 391 and 395 are connected to a positive reference voltage. The first delay means 375 is connected to a Q output 399 of the flip-flop 391 as indicated by the line 377. The second delay means comprised in the second jittered pulse means 363 is connected to a Q output 401 of the flip-flop 395 as indicated by the line 379.

The first sequence of clock pulses having a period 2T is provided at the output 399 of the flip-flop 391, and the second sequence of clock pulses, having a like period but 90 degrees out of phase with the first sequence, is provided at the output 401 of the flip-flop 395. The first sequence of jittered pulses is provided by the first jittered pulse means 361 by delaying sequential ones of the first sequence of clock pulses for an interval of time that varies between zero and T, but since the first clock sequence has a period of 2T, each pulse of the first sequence of jittered pulses will be separated from each other by an interval of time that is at least as long as T. The second sequence of jittered pulses is provided by the second jittered pulse means 363 in a similar manner.

Signal inputs 403 and 405 of the first and second processing means 365 and 367, respectively, are connected to an input port 407 as indicated by a line 409 to receive an input signal. Pulse inputs 411 and 413 of the first and second processing means 365 and 367 are connected to outputs 415 and 417 of the first and second jittered pulse means 361 and 363 as indicated by the lines 369 and 371, respectively. An output 419 of the first processing means 365 is connected to a first output port 421 to provide a first output signal. An output 423 of the second processing means 367 is connected to a second output port 425 to provide a second output signal.

The output of the first processing means 365 can be considered as the result of a sequence of processing operations performed during a sequence of odd-numbered time intervals of duration T, and the output of the second processing means 367 can be considered as a similar result of opera performed during a sequence of even-numbered sampling intervals of duration T. In other words, in the dual-clock apparatus a processing operation is performed once during every interval of duration T, as is done in the previously-described single-clock apparatus, but without the introduction of any unwanted "setup time" alias frequencies into the output signal.

In dual clock sampling apparatus embodying the invention, the first processing means 365 comprises first sampling means for sampling an input signal provided at the input port 407, operative to provide a first output signal indicative of the value of the input signal when a jittered pulse of the first sequence is provided, and the second processing means 367 comprises second sampling means for sampling the input signal, operative to provide a second output signal indicative of the value of the input signal when a jittered pulse of the second sequence is provided.

The dual clock sampling apparatus may include logic means 427 for providing a signal indicative of the times at which the jittered pulses are provided. A first input 429 of the logic means 427 is connected to the output 415 of the first jittered pulse means 316 as indicated by a line 431. A second input 433 of the logic means 427 is connected to the output 417 of the second jittered pulse means 363 as indicated by a line 435. An output 437 of the logic means 427 is connected to an output port 439 to provide the signal indicative of the times at which the jittered pulses are provided.

In dual clock frequency synthesis apparatus embodying the invention, the first processing means 365 comprises first synthesis means, operative to synthesize a first out put signal having a frequency as specified by an externally provided control signal, and the second processing means 367 comprises second synthesis means, operative to synthesize a second output signal having a frequency as specified by the control signal.

The dual clock frequency synthesis apparatus may include output logic means 441 in electrical communication with the first and second processing means 365 and 367, responsive to the first and second output signals to provide a final output signal. First and second inputs 443 and 445 of the logic means 441 are connected to the output ports 421 and 425, as indicated by lines 447 and 449, respectively. An output 451 of the logic means 441 is connected to a final output port 453 to provide the final output signal.

The first synthesis means may comprise any of the synthesis means previously discussed, such as an accumulator or a fractional divider. An additional processing circuit such as a phase interpolator or a digital sine wave generator may be provided.

The logic means 441 may comprise a gate, operative to provide a final output signal in the form of a pulse in response to a pulse from either of the processing means 365 or 367. Or the logic means 441 may comprise switching means, operative to switch the final output port 453 back and forth between the processing means 365 and 367 according to which one is then providing an output signal.

Figure 11:
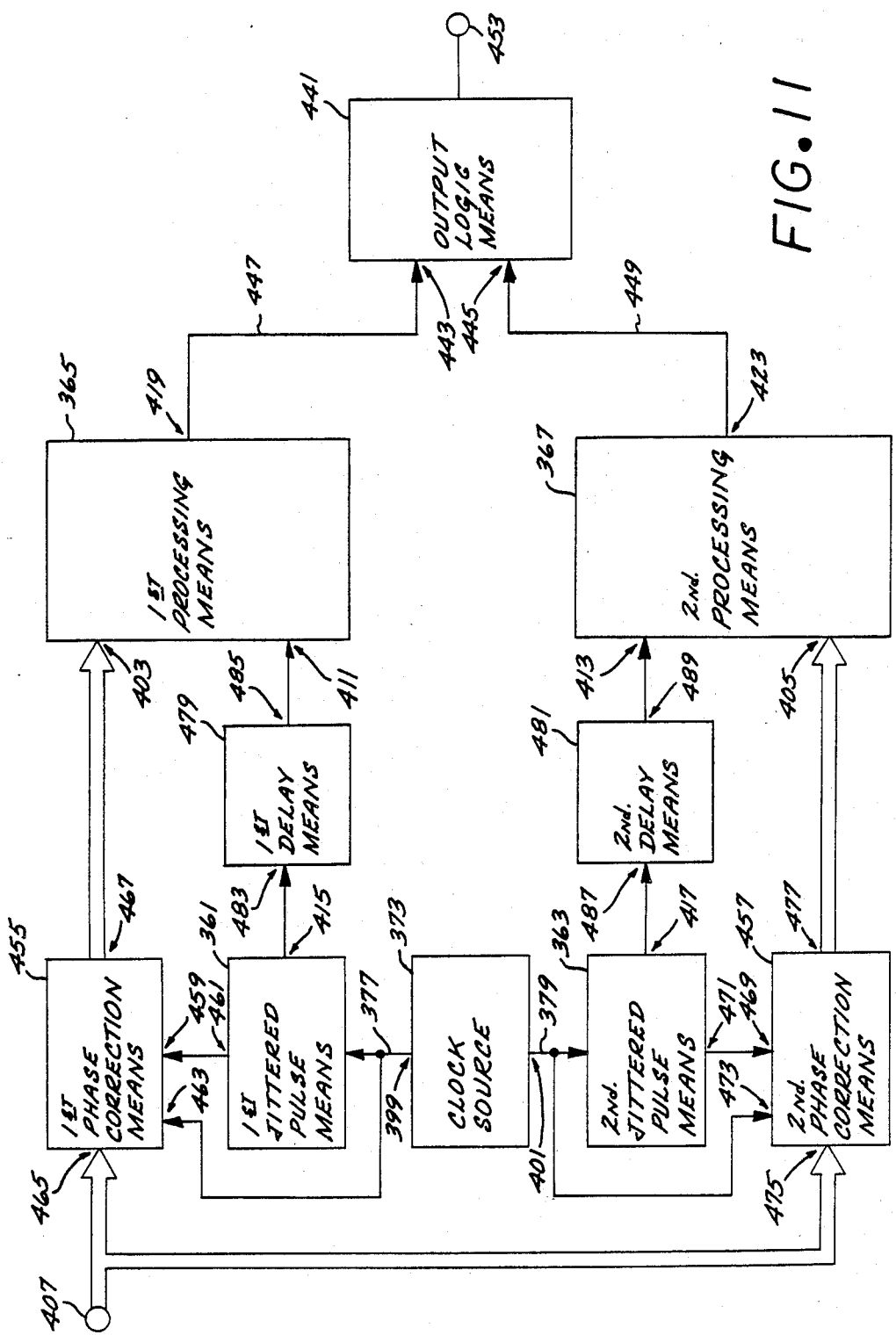
FIG. 11 is a block diagram of a dual clock reduced-alias frequency synthesizer similar to the apparatus of FIG. 10 and including phase correction means.

A dual clock frequency synthesizer according to the invention and including phase correction of the externally provided control signal is shown in FIG. 11. This embodiment is similar to that shown in FIG. 10, except for the phase correction feature, and for convenience components in FIG. 11 that are similar to components in FIG. 10 are as signed the same reference numerals.

First phase correction means 455, similar to the phase correction means 305 shown in FIG. 9, provides a first phase corrected control signal by scaling the externally provided control signal according to the time intervals between sequential ones of the first series of jittered pulses, and second phase correction means 457 provides a second phase corrected control signal by scaling the externally provided signal according to the second series of jittered pulses.

A selected signal input port 459 of the first phase correction means 455 is connected to a selected signal output 461 of the first jittered pulse means 361 to receive the selected signal. A clock pulse input port 463 of the first phase correction means 455 is connected to the output 399 of the clock source 373 to receive the first sequence of clock pulses. A control signal input port 465 of the first phase correction means 455 receives the externally provided control signal. An output port 467 of the first phase correction means 455 is connected to the signal input port 403 of the first processing means 365.

Similarly, a selected signal input port 469 of the second phase correction means 457 is connected to a selected signal output 471 of the second jittered pulse means 363 to receive the selected signal. A clock pulse input port 473 of the second phase correction means 457 is connected to the output 401 of the clock source 373 to receive the second sequence of clock pulses. A control signal input port 475 of the second phase correction means 457 receives the externally provided control signal. An output port 477 of the second phase correction means 457 is connected to the signal input port 413 of the second processing means 367.

The first and second phase correction means 455 and 457 function similarly to the phase correction means 305 to provide, respectively, first and second phase corrected control signal to the processing means 365 and 367.

First and second delay means 479 and 481 may be provided to delay the first and second jittered pulses, respectively, for the length of time needed for the phase correction means 455 and 457 to provide the phase corrected control signals. An input 483 of the first delay means 479 is connected to the output 415 of the first jittered pulse means, and an output 485 of the first delay means 479 is connected to the pulse input 411 of the first processing means 365. Similarly, an input 487 of the second delay means 481 is connected to the output 417 of the second jittered pulse means, and an output 489 of the second delay means 481 is connected to the pulse input 413 of the second processing means 367.

Digital computation means may be utilized to provide the first and second sequences of jittered pulses and the first and second phase corrected control signals instead of the circuitry described above. Such computation means might include a random process, a lookup table, or other suitable means from which to derive the randomly-selected intervals, and calculating means, a lookup table, or other means to calculate the corrected control signals.

As previously noted, the random numbers from which the time intervals between successive jittered pulses are derived are described as independent random numbers having a uniform probability density in a region bounded by zero and T. Optimum results are achieved by allowing the random numbers to assume any value in the defined region. However, good results are also obtainable by limiting the random numbers to a discrete quantity P of values, and in some cases satisfactory results can also be obtained by using a repeating pseudorandom sequence of length P, as the following mathematical analysis demonstrates.

If a signal v(t) is sampled at successive intervals of time, where the time of taking the nth sample is expressed as $t_n$, the result is a set of samples $v_n(t)$. Adding these samples together yields a sum $v_s(t)$ that can be expressed as $$v_s(t) = \sum_{n=0}^{N} v(t)\delta(t - t_n) \quad (1)$$

where $\delta(t-t_n)$ is the unit impulse function (delta Dirac function) at the sampling time $t_n$.

Sampling at equally spaced intervals of time results in aliasing. In particular, if the sampling is done at equally spaced intervals of time $T_c$ corresponding with a sampling frequency $f_c$, then the nth interval $t_n$ can be expressed as $t_n=nT_c$. Substituting $nT_c$ for $t_n$ in equation (1) above gives $$V_s(f) = \sum_{n=0}^{N} v(t)e^{-jn2\pi fT_c} \quad (2)$$

where $V_s(f)$ is the Fourier transform of $v_s(t)$ and f is the frequency of v(t). However, for any given frequency f, equation (2) gives the same result for $V_s(f)$ if f is replaced by a frequency f' that satisfies the relation $$f' = f + mf_c \quad (3)$$

where m is any integer. Thus, from examining $V_s(f)$, it is not possible to determine whether v(t) contains a frequency equal to f or whether it contains one or more aliases of f such as $f_1=f+f_c$, $f_2=f+2f_c$, or the like.

This aliasing problem can be solved by sampling at unequally spaced intervals of time. In particular, if the time $t_n$ of taking the nth sample is determined according to the equation $$t_n = nT_c + x_n \quad (4)$$

where $x_n$ changes from sample to sample, then aliasing can be reduced to any desired level if the $x_n$ are correctly chosen.

If the signal v(t) is ergodic, then the following equation can be derived from equation (1):

$$R_s(t) = R(t)g(t) \quad (5)$$

where R(t) is the autocorrelation function of v(t), $R_s(t)$ is the autocorrelation function of $V_s(t)$, and $$g(t) = \frac{f_c}{N} \sum_{n=0}^{N} \sum_{n'=0}^{N} \delta(t - t_n + t_{n'}) \quad (6)$$

where n and n' are integers. G(f), the Fourier transform of g(t), can then be expressed as $$G(f) = \frac{f_c}{N} \sum_{n=0}^{N} \sum_{n'=0}^{N} e^{-j2\pi f(t_n - t_{n'})} \quad (7)$$

If the $x_n$ are independent random variables having no correlation with the summing process and all having the same probability density p(r), then M(f), the characteristic function for $x_n$, is given by $$M(f) = \int p(r)e^{j2\pi fr}dr \quad (8)$$

and <G(f)> (the ensemble average of G(f) in the limit of large N) can be expressed as $$<G(f)> = f_c\left\{ |M(f)|^2 \left( \sum_{m=-\infty}^{\infty} \delta(f - mf_c) - 1 \right) + 1 \right\} \quad (9)$$

where m is any integer.

If the $x_n$ are uniformly distributed between $-(T_c/2)$ and $(T_c/2)$, inclusive, then M(f) becomes $$M(f) = \frac{\sin(\pi fT_c)}{\pi fT_c} \quad (10)$$

and $M(mf_c)=0$ for all non-zero m. <G(f)> then becomes $$<G(f)> = f_c\delta(f) + f_c(1 - |M(f)|^2) \quad (11)$$

and all aliasing is eliminated down to a continuous aliasing floor given by the second term of equation (11). This remarkable property is a unique feature of a uniform probability distribution because of the zeros in its (sin (f)/f) characteristic function M(f). Other probability distributions (for example, the Gaussian distribution) do not produce the same result because their characteristic functions do not have the same pattern of zeros (for example, the Gaussian characteristic function has no zeros).

If the $x_n$ are limited to P discrete values between $-(T_c/2)$ and $(T_c/2)$, inclusive, then $$|M(f)|^2 = \left| \frac{e^{j2\pi fT_c} - 1}{P(e^{j2\pi fT_c/P} - 1)} \right|^2 \quad (12)$$

and for $f = mf_c$, where m is any integer, both sides of equation (12) are equal to zero if m is not an integral multiple of P or 1 if m is an integral multiple of P. $<G(f)>$ can then be expressed as $$<G(f)> = f_c \sum_{m=-\infty}^{\infty} \{\delta(f - mPf_c) + f_c(1 - |M(f)|^2)\}. \quad (13)$$

Thus, where the $x_n$ comprise a discrete uniform probability distribution, aliasing occurs at multiples of P of the sampling frequency $f_c$. (There is also the same continuous aliasing floor as in the case of the continuous uniform probability distribution.)

If the $x_n$ comprise a pseudorandom sequence of length P, G(f) can be expressed as $$G(f) = G_1(f)G_2(f) \quad (14)$$

where $$G_1(f) = \frac{P}{N} \sum_{k=-\infty}^{\infty} \sum_{k'=-\infty}^{\infty} e^{-j2\pi fPT_c(k-k')} \quad (15)$$

and $$G_2(f) = \frac{f_c}{P} \sum_{n=0}^{P} \sum_{n'=0}^{P} e^{-j2\pi nf(t_n - t_{n'})} \quad (16)$$

where $n = kP + p$ and $n' = k'P + p'$. If N is a multiple of P then $$G_1(f) = \frac{1}{P} \sum_{m=-\infty}^{\infty} \delta\left(f - \frac{m}{P}f_c\right). \quad (17)$$

Provided the pseudorandom sequence is uncorrelated with the summations, $|M(f)|^2$ is again given by equation (12) and $<G(f)>$ is expressed as $$<G(f)> = f_c \sum_{m=-\infty}^{\infty} \left\{ \delta(f - mPf_c) + \frac{f_c}{P}(1 - |M(f)|^2)\delta\left(f - \frac{m}{P}f_c\right) \right\} \quad (18)$$

Thus, where the $x_n$ comprise a pseudorandom sequence of length P, aliasing occurs at a level of (1/P) at frequencies which are multiples of ($f_c/P$) in addition to the aliasing which occurs in the case of the discrete uniform probability distribution.

All of the above results are unchanged if the $x_n$ are uniformly distributed between zero and $T_c$, inclusive, rather than between $-(T_c/2)$ and $(T_c/2)$.

The external control signal which specifies the output frequency of a synthesizer embodying the invention typically is provided in digital form. The value K of this control signal is proportional to the desired output frequency, the constant of proportionality being determined by the internal structure of the means used to synthesize the output signal.

If the synthesis means comprises an accumulator, then the value of K required to produce an output signal (sequence of carry pulses) having a desired frequency F is $$K = \frac{2^N F}{f_c} \quad (19)$$

where N is the maximum bit capacity of the accumulator.

If the synthesis means comprises a fractional divider having a divide by n/divide by n+1 counter and a modulus controller, then the value of K required to produce an output signal of frequency F is $$K = 2^N\left(\frac{f_c}{F} - n\right) \quad (20)$$

where N is the maximum bit capacity of the modulus controller and n is the modulus of the counter.

The fact that the control signal remains constant while the pulses which drive the synthesizer are jittered accounts for the presence of phase noise in the output signal. This phase noise can be reduced by scaling the control signal, each time a jittered pulse is provided, according to the ratio between the time interval I between two consecutive pulses and the period T.

More particularly, the time $t_n$ at which the nth jittered pulse occurs is $$t_n = nT + x_n \quad (21)$$

where $x_n$ is the duration of the interval of time by which the nth pulse is delayed. The length of the time interval $I_n$ between the nth pulse and its predecessor is then $$I_n = t_n - t_{n-1} = T + x_n - x_{n-1} \quad (22)$$

and the ratio between $I_n$ and T is $$\frac{I_n}{T} = \frac{t_n - t_{n-1}}{T} = 1 + \frac{x_n - x_{n-1}}{T}. \quad (23)$$

Scaling K by this ratio yields a phase-corrected control signal $K'_n$ given by $$K'_n = K\left(\frac{t_n - t_{n-1}}{T}\right) = K\left(1 + \frac{x_n - x_{n-1}}{T}\right). \quad (24)$$

The time $t_n$ at which the nth pulse is provided can be scaled to provide a new quantity $y_n$ given by $$y_n = \frac{t_n}{T}. \quad (25)$$

$K'_n$ can then be expressed as $$K'_n = K(y_n - y_{n-1}). \quad (26)$$

If the timing means 319 of FIG. 9 comprises a cumulative timer and latch, the timing means 319 can provide $y_n$ as the scaling signal by appropriately scaling $t_n$. The logic means 323 then need only perform a subtraction between $y_n$ as provided by the timing means 319 and $y_{n-1}$ as provided by the register 321 to provide the phase correction signal.

However, if the logic means 323 receives digital representations of the selected signals $x_n$ and $x_{n-1}$, then the logic means 323 must include means to take the difference between said values, divide said difference by T, and increase the quotient by one to provide the phase correction signal.

The present invention represents a significant advance in that it provides a practical method and apparatus for reducing the effects of aliasing during signal processing such as sampling a signal or synthesizing a signal. Of course, many variations and modifications of the invention are possible in light of the above teachings. It is therefore to be understood that, within the scope of the appended claims, the invention may be practiced otherwise than as specifically described.

I claim:

1. An alias reducing signal processing apparatus comprising:
   jittered pulse means, operative to provide a sequence of jittered pulses, each pulse occurring during one of a sequence of time intervals of duration T at a time determined by a sequential one of a set of independent random numbers having a uniform probability density in a region bounded by zero and T; and
   processing means, in electrical communication with the jittered pulse means, operative to perform a signal processing operation in response to the jittered pulses.

2. Apparatus according to claim 1 wherein the random numbers are indicated by a random signal provided by a random signal generator, the generator comprising:
   a noise source, operative to provide a noise signal having a randomly varying value;
   a reference source, operative to provide a reference signal;
   reference signal correction means, having a first input in electrical communication with the noise source and a second input in electrical communication with the reference source, operative to generate a correction signal if the absolute value of the difference between the noise signal and the reference signal exceeds a bracket amount, the correction signal tending to change the value of the reference signal so as to reduce the absolute value of said difference; and
   comparator means, in electrical communication with the noise source and the reference source, operative to provide the random signal by comparing the value of the reference signal with the value of the noise signal.

3. Apparatus according to claim 1 wherein the jittered pulse means comprises digital processing means.

4. Apparatus according to claim 1 wherein the processing means comprises sampling means for sampling an externally provided input signal, operative to provide an output signal indicative of the value of the input signal when a jittered pulse is provided.

5. Apparatus according to claim 4 and further comprising logic means, electrically connected to the processing means, for providing a signal indicative of the time at which the jittered pulse is provided.

6. Apparatus according to claim 1 and further comprising a clock source, operative to provide a sequence of clock pulses having a period of duration T to define the sequence of time intervals.

7. Apparatus according to claim 6 wherein the jittered pulse means comprises delay means, in electrical communication with the clock source, operative to provide the jittered pulses by delaying sequential ones of the clock pulses for sequential ones of a set of time intervals determined by the random numbers.

8. Apparatus according to claim 7 wherein the delay means comprises:
   a random signal selector, in electrical communication with the clock source, operative to generate a random signal indicative of the random numbers and responsive to a clock pulse to provide a selected signal having a value determined by the random signal;
   a ramp source, in electrical communication with the clock source, responsive to a clock pulse to provide a ramp signal which begins at an initial value and increases at a constant rate; and
   comparator means, in electrical communication with the ramp source and the random signal selector, operative to provide a jittered pulse when the value of the ramp signal becomes equal to the value of the selected signal.

9. Apparatus according to claim 7 wherein the delay means comprises:
   a random signal selector, in electrical communication with the clock source, operative to generate a random signal indicative of the random numbers and responsive to a clock pulse to provide a selected signal having a value determined by the random signal;
   a ramp source, in electrical communication with the clock source and the random signal selector, responsive to a clock pulse to provide a ramp signal which begins at an initial value and increases at a rate determined by the value of the selected signal; and
   comparator means, in electrical communication with the ramp source, operative to provide a jittered pulse when the value of the ramp signal becomes equal to a predetermined value.

10. Apparatus according to claim 1 wherein the processing means comprises synthesis means, operative to synthesize an output signal having a desired frequency as specified by an externally provided control signal.

11. Apparatus according to claim 10 wherein the synthesis means comprises an accumulator operative to provide a carry pulse responsive to accumulation of a predetermined number of said jittered pulses.

12. Apparatus according to claim 10 wherein the synthesis means comprises a fractional divider means for counting said jittered pulses operative to provide a carry pulse responsive to a predetermined number of said jittered pulses.

13. Apparatus according to claim 10 and further comprising phase interpolator means.

14. Apparatus according to claim 10 and further comprising sine wave generation means.

15. An aliasing reducing frequency synthesizer for synthesizing an output signal having a desired frequency as specified by an externally provided control signal, the synthesizer comprising:
   a clock source, operative to provide a sequence of clock pulses having a period of duration T;
   synthesis means, in electrical communication with the clock source, responsive to the clock pulses and to the control signal to synthesize a sequence of carry pulses; and delay means, in electrical communication with the synthesis means, responsive to the carry pulses to provide an output signal having the desired frequency by delaying sequential ones of the carry pulses for sequential ones of a set of time intervals determined by a set of independent random numbers having a uniform probability density in a region bounded by zero and T.

16. A synthesizer according to claim 15 wherein the randon numbers are indicated by a random signal provided by a random signal generator, the generator comprising:

a noise source, operative to provide a noise signal having a randomly varying value;

a reference source, operative to provide a reference signal;

reference signal correction means, having a first input in electrical communication with the noise source and a second input in electrical communication with the reference source, operative to generate a correction signal if the absolute value of the difference between the noise signal and the reference signal exceeds a bracket amount, the correction signal tending to change the value of the reference signal so as to reduce the absolute value of said difference; and comparator means, in electrical communication with the noise source and the reference source, operative to provide the random signal by comparing the value of the reference signal with the value of the noise signal.

17. A synthesizer according to claim 15 wherein the output signal comprises a sequence of output pulses and wherein the delay means comprises:

a random signal selector, in electrical communication with the synthesis means, operative to generate a random signal indicative of the random numbers and responsive to a carry pulse to provide a selected signal having a value determined by the random signal;

a ramp source, in electrical communication with the synthesis means, responsive to a carry pulse to provide a ramp signal which begins at an initial value and increases at a constant rate; and comparator means, in electrical communication with the ramp source and the random signal selector, operative to provide an output pulse when the value of the ramp signal becomes equal to the value of the selected signal.

18. A synthesizer according to claim 15 wherein the output signal comprises a sequence of output pulses and wherein the delay means comprises:

a random signal selector, in electrical communication with the synthesis means, operative to generate a random signal indicative of the random numbers and responsive to a carry pulse to provide a selected signal having a value determined by the random signal;

a ramp source, in electrical communication with the synthesis means and the random signal selector, responsive to a carry pulse to provide a ramp signal which begins at an initial value and increases at a rate determined by the value of the selected signal; and comparator means, in electrical communication with the ramp source, operative to provide an output pulse when the value of the ramp signal becomes equal to a predetermined value.

19. A synthesizer according to claim 15 wherein the synthesis means comprises an accumulator operative to provide a carry pulse responsive to accumulation of a predetermined number of said clock pulses.

20. A synthesizer according to claim 15 wherein the synthesis means comprises a fractional divider means for counting said clock pulses operative to provide a carry pulse responsive to a predetermined number of said clock pulses.

21. A synthesizer according to claim 15 wherein the synthesis means is operative to synthesize a phase signal indicative of any phase deviation between the carry pulses and the desired frequency, and further comprising phase interpolator means, in electrical communication with the delay means and the synthesis means, responsive to the phase signal and to the output signal from the delay means to provide a final output signal having the desired frequency.

22. A synthesizer according to claim 15 wherein the synthesis means is operative to synthesize a phase signal, and further comprising sine wave generation means, in electrical communication with the delay means and the synthesis means, responsive to the phase signal and to the output signal from the delay means to provide a final output signal having the desired frequency.

23. A phase-corrected aliasing reducing frequency synthesizer for synthesizing an output signal having a desired frequency as specified by an externally provided control signal, the synthesizer comprising:

jittered pulse means, operative to provide a sequence of jittered pulses, each pulse occurring during one of a sequence of time intervals of duration T at a time determined by a sequential one of a set of independent random numbers having a uniform probability density in a region bounded by zero and T;

phase correction means, in electrical communication with the jittered pulse means, operative to provide a phase corrected control signal by scaling the externally provided control signal according to the time intervals between sequential ones of the jittered pulses; and synthesis means, in electrical communication with the phase correction means and the jittered pulse means, responsive to the phase corrected control signal and the jittered pulses to provide an output signal having the desired frequency.

24. A synthesizer according to claim 23 wherein the random numbers are indicated by a random signal provided by a random signal generator, the generator comprising:

a noise source, operative to provide a noise signal having a randomly varying value;

a reference source, operative to provide a reference signal;

reference signal correction means, having a first input in electrical communication with the noise source and a second input in electrical communication with the reference source, operative to generate a correction signal if the absolute value of the difference between the noise signal and the reference signal exceeds a bracket amount, the correction signal tending to change the value of the reference signal so as to reduce the absolute value of said difference; and comparator means, in electrical communication with the noise source and the reference source, operative to provide the random signal by comparing the value of the reference signal with the value of the noise signal.

25. A synthesizer according to claim 23 wherein the synthesis means comprises an accumulator operative to provide a carry pulse responsive to accumulation of a predetermined number of said jittered pulses.

26. A synthesizer according to claim 23 wherein the synthesis means comprises a fractional divider means for counting said jittered pulses operative to provide a carry pulse responsive to a predetermined number of said jittered pulses.

27. A synthesizer according to claim 23 and further comprising phase interpolator means.

28. A synthesizer according to claim 23 and further comprising sine wave generation means.

29. A synthesizer according to claim 23 wherein the jittered pulse means comprises digital processing means.

30. A synthesizer according to claim 29 wherein the phase correction means comprises:
logic means, electrically connected to the digital processing means, operative to generate a phase correction signal proportional to the interval of time between successive jittered pulses; and
scaling means, in electrical communication with the logic means, operative to provide the phase corrected control signal by scaling the externally provided control signal in proportion to the phase correction signal.

31. A synthesizer according to claim 23 and further comprising a clock source, operative to provide a sequence of clock pulses characterized by a period of duration T to define the sequence of time intervals.

32. A synthesizer according to claim 31 wherein the jittered pulse means comprises delay means, in electrical communication with the clock source, operative to provide the jittered pulses by delaying sequential ones of the clock pulses for sequential ones of a set of time intervals determined by the random numbers.

33. A synthesizer according to claim 32 wherein the delay means comprises:
a random signal selector, in electrical communication with the clock source, operative to generate a random signal indicative of the random numbers and responsive to a clock pulse to provide a selected signal having a value determined by the random signal;
a ramp source, in electrical communication with the clock source, responsive to a clock pulse to provide a ramp signal which begins at an initial value and increases at a constant rate; and
comparator means, in electrical communication with the ramp source and the random signal selector, operative to provide a jittered pulse when the value of the ramp signal becomes equal to the value of the selected signal.

34. A synthesizer according to claim 33 wherein the phase correction means comprises:
logic means, electrically connected to the random signal selector, responsive to the random signal to generate a phase correction signal proportional to the interval of time between successive jittered pulses; and
scaling means, in electrical communication with the logic means, operative to provide the phase corrected control signal by scaling the externally provided control signal in proportion to the phase correction signal.

35. A synthesizer according to claim 32 wherein the delay means comprises:
a random signal selector, in electrical communication with the clock source, operative to generate a random signal indicative of the random numbers and responsive to a clock pulse to provide a selected signal having a value determined by the random signal;
a ramp source, in electrical communication with the clock source and the random signal selector, responsive to a clock pulse to provide a ramp signal which begins at an initial value and increases at a rate determined by the value of the selected signal; and
comparator means, in electrical communication with the ramp source, operative to provide a jittered pulse when the value of the ramp signal becomes equal to a predetermined value.

36. A synthesizer according to claim 35 wherein the phase correction means comprises:
logic means, electrically connected to the random signal selector, responsive to the random signal to generate a phase correction signal proportional to the interval of time between successive jittered pulses; and
scaling means, in electrical communication with the logic means, operative to provide the phase corrected control signal by scaling the externally provided control signal in proportion to the phase correction signal.

37. Dual clock aliasing reducing signal processing apparatus comprising:
first jittered pulse means, operative to provide a first sequence of jittered pulses, each pulse occurring during a predefined portion of one of a first sequence of time intervals of duration 2T at a time determined by a sequential one of a first set of independent random numbers having a uniform probability density in a region bounded by zero and T;
second jittered pulse means, operative to provide a second sequence of jittered pulses, each pulse occurring during a predefined portion of one of a second sequence of time intervals of duration 2T at a time determined by a sequential one of a second set of independent random numbers having a uniform probability density in a region bounded by zero and T, said second sequence of time intervals having a predetermined phase relationship with the first sequence of time intervals;
first processing means, in electrical communication with the first jittered pulse means, operative to perform a signal processing operation in response to jittered pulses of the first sequence; and
second processing means, in electrical communication with the second jittered pulse means, operative to perform a signal processing operation in response to jittered pulses of the second sequence.

38. Apparatus according to claim 37 wherein the first set of random numbers are indicated by a random signal provided by a random signal generator, the generator comprising:
a noise source, operative to provide a noise signal having a randomly varying value;
a reference source, operative to provide a reference signal;

reference signal correction means, having a first input in electrical communication with the noise source and a second input in electrical communication with the reference source, operative to generate a correction signal if the absolute value of the difference between the noise signal and the reference signal exceeds a bracket amount, the correction signal tending to change the value of the reference signal so as to reduce the absolute value of said difference; and comparator means, in electrical communication with the noise source and the reference source, operative to provide the random signal by comparing the value of the reference signal with the value of the noise signal.

39. Apparatus according to claim 37 and further comprising a clock source, operative to provide a first sequence of clock pulses having a period of duration 2T and a second sequence of clock pulses having a like period and having a predetermined phase relationship to the first sequence.

40. Apparatus according to claim 39 wherein the first jittered pulse means comprises first delay means, in electrical communication with the clock source, operative to provide the first sequence of jittered pulses by delaying sequential ones of the first sequence of clock pulses for sequential ones of a set of time intervals determined by the first set of random numbers.

41. Apparatus according to claim 37 wherein the first jittered pulse means comprises digital processing means.

42. Apparatus according to claim 37 wherein:
the first processing means comprises first sampling means for sampling an input signal, operative to provide a first output signal indicative of the value of the input signal when a jittered pulse of the first sequence is provided; and
the second processing means comprises second sampling means for sampling the input signal, operative to provide a second output signal indicative of the value of the input signal when a jittered pulse of the second sequence is provided.

43. Apparatus according to claim 42 and further comprising logic means for providing a signal indicative of the times at which the jittered pulses are provided.

44. Apparatus according to claim 37 wherein:
the first processing means comprises first synthesis means, operative to synthesize a first output signal having a frequency as specified by an externally provided control signal; and
the second processing means comprises second synthesis means, operative to synthesize a second output signal having a frequency as specified by the control signal.

45. Apparatus according to claim 37 and further comprising:
first phase correction means, in electrical communication with the first jittered pulse means, operative to provide a first phase corrected control signal by scaling an externally provided control signal according to the time intervals between sequential ones of the first sequence of jittered pulses; and
second phase correction means, in electrical communication with the second jittered pulse means, operative to provide a second phase corrected control signal by scaling the externally provided control signal according to the time intervals between sequential ones of the second sequence of jittered pulses.

46. Apparatus according to claim 45 wherein:
the first processing means comprises first synthesis means, operative to synthesize a first output signal having a frequency as specified by the first phase corrected control signal; and
the second processing means comprises second synthesis means, operative to synthesize a second output signal having a frequency as specified by the second phase corrected control signal.

47. Apparatus according to claim 46 and further comprising output logic means electrically connected to with the first and second processing means, responsive to the first and second output signals to provide a final output signal.

48. Apparatus according to claim 46 wherein the first synthesis means comprises an accumulator.

49. Apparatus according to claim 46 wherein the first synthesis means comprises a fractional divider.

50. Apparatus according to claim 46 and further comprising phase interpolator means.

51. Apparatus according to claim 46 and further comprising sine wave generation means.

52. A method of reducing aliasing in processing a signal, the method comprising:
providing a sequence of jittered pulses, each pulse occurring during one of a sequence of time intervals of duration T at a time determined by a sequential one of a set of independent random numbers having a uniform probability density in a region bounded by zero and T; and
performing a signal processing operation in response to the jittered pulses.

53. A method according to claim 52 wherein the processing operation comprises sampling an input signal.

54. A method according to claim 52 wherein the processing operation comprises synthesizing a signal having a desired frequency.

55. A dual-clock method of reducing aliasing in processing a signal, the method comprising:
providing a first sequence of jittered pulses, each pulse occurring during a predefined portion of one of a first sequence of time intervals of duration 2T at a time determined by a sequential one of a first set of independent random numbers having a uniform probability density in a region bounded by zero and T;
providing a second sequence of jittered pulses, each pulse occurring during a predefined portion of one of a second sequence of time intervals of duration 2T at a time determined by a sequential one of a second set of independent random numbers having a uniform probability density in a region bounded by zero and T, said second sequence of time intervals having a predetermined phase relationship with the first sequence of time intervals;
performing a signal processing operation in response to the first sequence of jittered pulses; and
performing said signal processing operation in response to the second sequence of jittered pulses.

56. A method according to claim 55 wherein the processing operation comprises an input signal.

57. A method according to claim 55 wherein the processing operation comprises synthesizing a signal having a desired frequency.

* * * * *

UNITED STATES PATENT AND TRADEMARK OFFICE
CERTIFICATE OF CORRECTION

PATENT NO. : 4,890,248

DATED : December 26, 1989

INVENTOR(S) : Victor S. Reinhardt

It is certified that error appears in the above-identified patent and that said Letters Patent is hereby corrected as shown below:

Claim 1, col. 21, line 19, delete "alias" and
    insert instead -- aliasing --.
  By Amendment dated June 26, 1989

Claim 16, col. 23, line 12, delete "randon" and
    insert instead -- random --.
  Page 45, line 2 of original specification.

Signed and Sealed this

Twelfth Day of February, 1991

Attest:

HARRY F. MANBECK, JR.

*Attesting Officer*  *Commissioner of Patents and Trademarks*